(12) United States Patent
Watts (10) Patent No.: US 6,289,600 B1
(45) Date of Patent: Sep. 18, 2001

(54) NON-CONTACT MEASURING DEVICE (75) Inventor: Kenneth J. Watts, Jefferson County, AL (US)

(73) Assignee: United States Pipe & Foundry Company, Birmingham, AL (US)

( * ) Notice: Subject to any disclaimer, the term of this patent is extended or adjusted under 35 U.S.C. 154(b) by 0 days.

(21) Appl. No.: 09/431,633

(22) Filed: Nov. 2, 1999

(51) Int. Cl.⁷ .............................. G01B 11/08; G01B 11/02
(52) U.S. Cl. ...................... 33/542; 33/555.1; 33/DIG. 21
(58) Field of Search .............................. 33/516, 529, 542, 33/543, 544.5, 551, 555, 555.1, DIG. 21; 356/3.1, 3.11

(56) References Cited

U.S. PATENT DOCUMENTS

| | | | |
|---|---|---|---|
| 3,181,246 | * 5/1965 | Jenkins et al. | 33/542 |
| 3,426,437 | * 2/1969 | Rebhun et al. | 33/543 |
| 4,521,968 | 6/1985 | Wiltermood et al. | 33/DIG. 21 |
| 4,642,902 | * 2/1987 | Niedermayr | 33/543 |
| 4,691,446 | 9/1987 | Pitches et al. | 33/516 |
| 5,359,781 | 11/1994 | Melville | 33/DIG. 21 |
| 5,454,175 | * 10/1995 | Li | 33/542 |
| 5,461,793 | 10/1995 | Melville | 33/DIG. 21 |
| 5,617,645 | 4/1997 | Wick et al. | 33/551 |
| 5,811,827 | * 9/1998 | Pryor et al. | 356/3.1 |
| 6,079,113 | * 5/2000 | Helmrichs | 33/555.1 |

\* cited by examiner

*Primary Examiner*—G. Bradley Bennett
(74) *Attorney, Agent, or Firm*—Bradley Arant Rose & White, LLP; Paul M. Sykes (57) ABSTRACT

A non-contact measuring device for determining the dimensions of a cylindrical object, such as a pipe. The device may use a programmable industrial robot with an arm terminating in a rotary joint, or wrist. A non-contact measurement assembly, which preferably includes a triangulation laser, mounted to the robot's wrist. The wrist includes a binary wrist encoder for providing the angular position of the wrist to an attached computer. Likewise, the laser provides a signal representative of the distance from the laser to the surface of the pipe to the computer. The robot positions the measurement assembly in a predetermined location within the pipe and rotates the measurement assembly. The computer correlates the measurements from the lasers with the angular position at which they were taken, and it analyzes this data to determine the dimensions of the pipe, including the true profile of the surface and cross-sectional shape. Because of the specific mathematics used by the computer, the measurement assembly does not need to be placed in the center of the pipe.

16 Claims, 9 Drawing Sheets

NON-CONTACT MEASURING DEVICE

BACKGROUND

The present invention relates to the field of measuring devices, specifically to non-contact devices for measuring the dimensions of a cylindrical object, such as a pipe. Pipe will be used as an exemplary work piece throughout this disclosure. During the process of manufacturing pipe, it is desirable to measure the dimensions of the pipe to ensure compliance with predetermined tolerances for quality control. Of particular concern are the dimensions of the pipe at its end that will form a juncture with a second piece of pipe. This end is referred to as the bell, and there are several dimensions on the bell that are critical to forming a proper juncture with another pipe. The measurements of the bell have traditionally been performed with simple "go/no-go" gauges, or at times with calipers.

Go/no-go gauges are mechanical articles of a fixed size which, when inserted (or attempted to be inserted) into a pipe will fit properly or not, thus indicating whether the pipe under test is acceptable. These gauges check the minimum or maximum dimensions at certain critical points in the bell, but they do not provide actual bell dimensions. Calipers provide actual dimensions, but there is simply not enough time in a modern manufacturing process to measure the pipe with calipers or any other standard measuring device. Moreover, most pipes are not truly circular. Therefore, in order to determine the shape of the pipe, one would have to make many measurements with calipers around its perimeter, increasing the time even more. It would be desirable to determine the shape of a pipe in order to identify precisely any sections that need to be ground in order to bring the pipe into conformity with manufacturing tolerances. In addition, if the shape of each pipe manufactured in the process were recorded, statistical analysis of the manufacturing process could be performed. Such statistical analysis is not feasible with a manual measurement system based on calipers or go/no-go gauges. As with any manual system, human error is pervasive. An automated system is needed.

Some automated contact systems are available. Such systems typically use some form of linear variable differential transformer or linear potentiometer, both of which require a sensor to touch the surface of the unit under test. However, the interior surface of a pipe may be abrasive, and in a volume manufacturing process the sensor would wear out in an unacceptably short time. Using such contact sensors therefore would increase maintenance costs and process down time, while decreasing the reliability, and over time, the precision of the measurement system. Moreover, the range of most contact sensors is rather limited and is insufficient to measure large diameter pipe. As discussed previously, there are several points of interest on the pipe bell. To measure multiple points with a contact system, the sensor would need to be removed from the surface, repositioned to the new location, and then placed in contact with the surface again. This procedure would prove too slow for a volume manufacturing process.

Moreover, those contact systems of which the inventor is aware rely on placing a device in the center of the pipe in order to measure it. However, as noted above, few pipes are truly circular in cross section. Thus, any measurement system which relies on placing the measurement device at the center of the pipe is based on a flawed premise.

Thus, there exists a need for an automated, non-contact measurement system for measuring the inside dimensions of pipe; that will provide and record precise, actual dimensions of the pipe being measured; that will provide the cross-sectional shape of the pipe for statistical analysis and grinding purposes; that will perform the measurement process in a fast manner suitable for a modem, volume manufacturing process; and that will do so without requiring the measurement device to be placed at the center of the pipe.

SUMMARY

The present invention provides an automated, non-contact measuring system that satisfies these needs. In a preferred embodiment, this system includes a measurement assembly with a laser that measures the distance to the surface of the cylindrical object being measured, such as a pipe. The measurement assembly is mounted to a rotatory joint such as the wrist of a robot, which in turn may be mounted to the robot's arm for positioning the measurement assembly within the pipe. The robot preferably is a programmable industrial robot and has a controller for controlling the rotation of its wrist and the movement of its arm. The measurement assembly is positioned within the pipe and is rotated so that the laser may measure the distance to the surface of the pipe along its interior. The robot wrist includes a wrist encoder that provides the angular position of the robot wrist (and therefore of the measurement assembly) as it rotates. The laser generates a linear displacement signal representative of the distance to the surface of the pipe, and the wrist encoder provides an angular position signal representative of the angular position of the measurement assembly. These signals are received by a data acquisition board in a programmable computer, which correlates the data from the linear displacement and angular position signals. A program in the computer then processes the data to determine the dimensions of the object. Because of the specific mathematics of the computer program, the measurement assembly need not be placed in the center of the pipe.

The present invention has many objects and advantages. One such object and advantage is to provide a non-contact, automated measuring system that minimizes human error.

A further object and advantage of the present invention is to provide precise, actual dimensions of a cylindrical object without requiring the measurement apparatus to be centered on the longitudinal axis of the cylinder.

A still further object and advantage of the present invention is to provide the cross-sectional shape of the object being measured in order to allow for statistical analysis and precision grinding.

Yet another object and advantage of the present invention is to provide a fast measurement process suitable for a modern, volume manufacturing process.

DESCRIPTION OF THE DRAWINGS

These and other features, aspects, and advantages of the present invention will become better understood with regard to the following description, claims, and accompanied drawings where:

DETAILED DESCRIPTION

Figure 1:
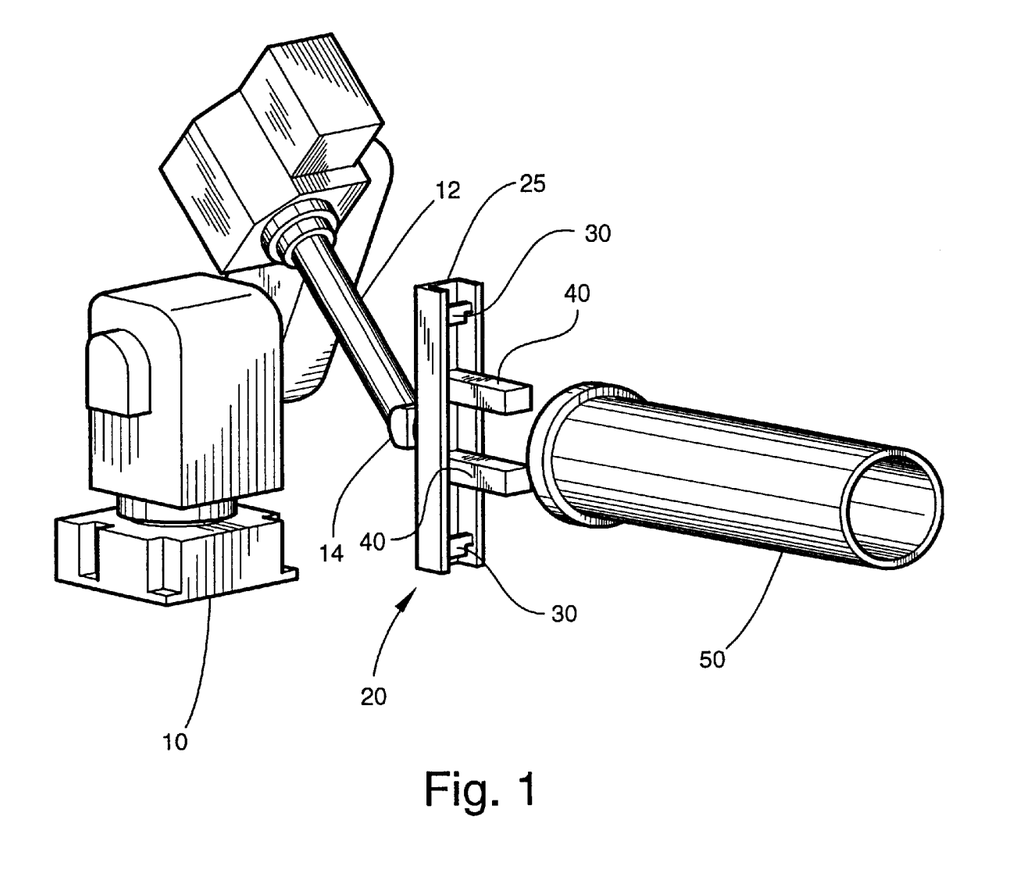
FIG. 1 shows a perspective view of a preferred embodiment of the present invention.

As shown in FIG. 1, an embodiment of the present invention includes a robot 10 and a measurement assembly 20. Also included is a programmed computer (not shown) and electronics that interface with the robot 10 and the measurement assembly 20. In this embodiment, the measurement assembly 20 includes an adapter bracket 25, positioning tables 30, and laser assemblies 40. Also shown is a pipe under test 50. The relative positions of the pipe 50 and measurement assembly 20 are their positions prior to measuring the pipe. The robot 10 places the measurement assembly 20 in a predetermined longitudinal position within the pipe 50, and lasers within the laser assemblies 40 provide dimensional data at that location as they are rotated, which is discussed in detail below.

The robot 10 is preferably a programmable industrial robot including a controller adaptable to interface with a programmable computer. An example of such a robot is the Fanuc M710I robot. The robot 10 includes an arm 12, which terminates in a rotary joint, or wrist, 14. The arm 12 functions to position the measurement assembly 20 at a desired longitudinal position within the pipe 50. The measurement assembly 20 is mounted to the rotary wrist 14. In use, the wrist rotates the measurement assembly so that dimensional data may be gathered along a desired portion of, or the entirety of, the surface of the pipe 50. A rotary wrist encoder (not shown) is coupled to the wrist 14 and detects its angular position. The encoder transmits this information to the programmed computer, which takes distance readings at desired angular positions. The angular and distance data is processed by the computer program to determine the shape of the pipe.

In the embodiment shown, the measurement assembly 20 includes the adapter bracket 25, to which the precision positioning tables 30 are mounted. The laser assemblies 40 are mounted to the precision positioning tables 30, one laser assembly to each table. Two identical, complimentary laser assembly/positioning table combinations are used so that readings about the entire pipe surface may be taken during only a one-half rotation of the measurement assembly 20. This use of complimentary laser assembly/positioning table combinations thus increases the speed of the measurement process; however, only one such combination could be used if so desired.

Figure 2:
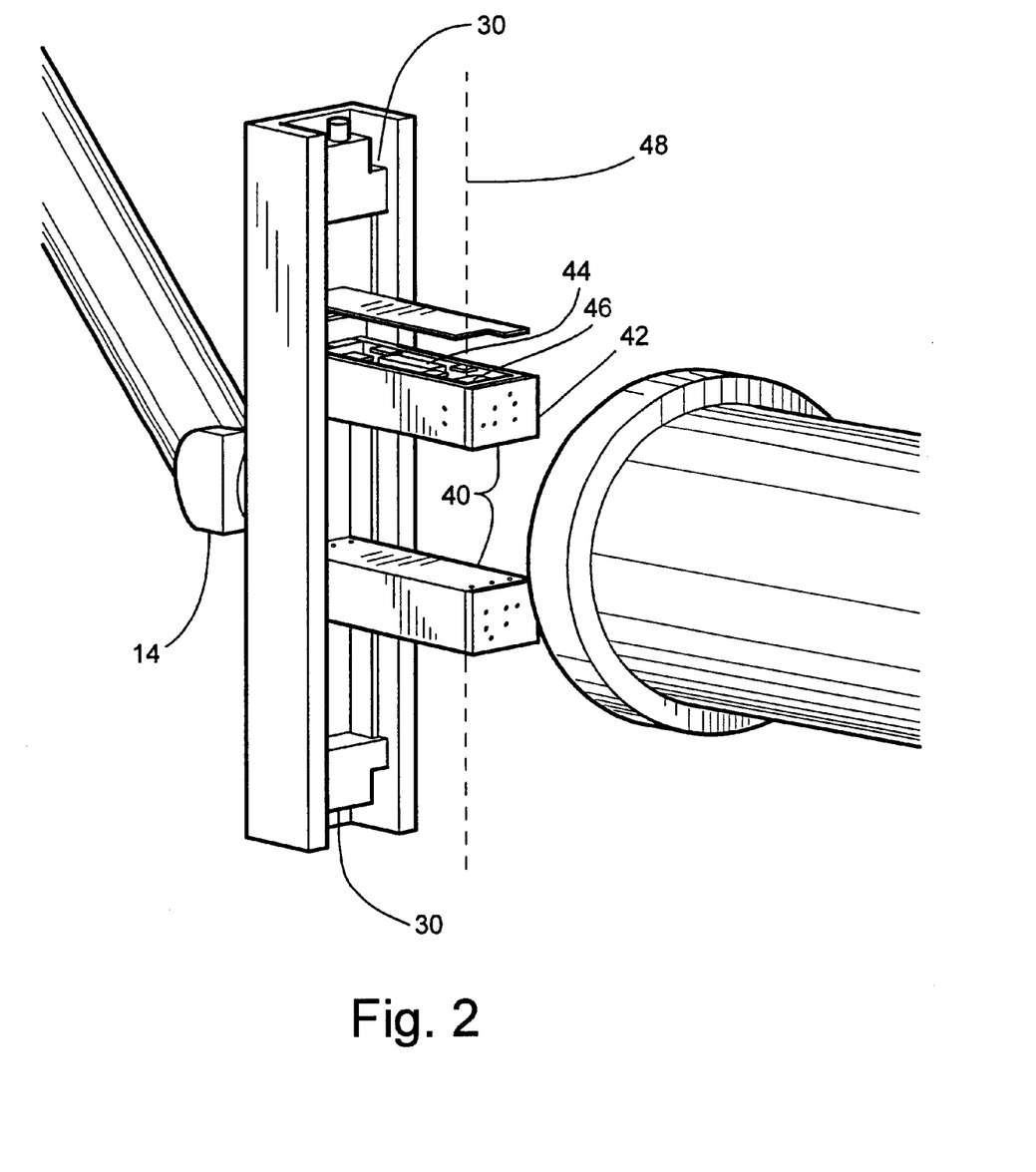
FIG. 2 shows a perspective view of the measurement assembly of the machine of FIG. 1, with one enclosure partially exploded.

As shown in FIG. 2, a laser assembly 40 includes a laser enclosure 42, partially broken away to reveal a laser controller 44 and a laser 46. The laser enclosure 42 is an optional mechanical housing that protects the laser 46 and its controller 44 from the harsh environment that may exist in a manufacturing facility. The lasers 46 emit laser beams 48 which bounce off of the surface of the pipe to measure its distance from the laser. The laser controller 44 interfaces with the programmed computer. As discussed below, the controller 44 provides to the computer a signal representative of the measured distance. The positioning tables 30 position the lasers 46 radially with respect to the pipe so that the surface to be measured is within the optimal range of the lasers. The positioning tables 30 are responsive to control signals from the programmed computer to precisely position the lasers 46 at a desired distance from the axis of rotation of the measurement assembly 20 about the rotary wrist 14.

It should be noted that alternative non-contact measuring devices may be used within the measurement assembly 20, depending upon the required precision of the measurements. Available non-contact technologies include ultrasonic measuring sensors, lasers using a time-of-flight system for measurement, and triangulation lasers. Ultrasonic sensors and time-of-flight lasers have a relatively long range, but with the present state of the art, their precision is less than desired. It is possible that advances in the art of time-of-flight lasers and ultrasonic sensors will increase their precision to a desired level. Nevertheless, if one was not concerned with highly precise measurements (e.g., within 0.01 inches), time-of-flight lasers or ultrasonic sensors could be used. Triangulation lasers are preferred because of their high precision. However, with the present state of the art, triangulation lasers have a somewhat limited range (e.g., about 8 inches). In order to place the surface to be measured of a relatively large pipe (e.g., a 32-inch radius or larger pipe) within the optimal range of current triangulation lasers, the precision positioning tables 30 are used. If advances in the art of triangulation lasers increase their range, or if the radius of the pipe 50 is within the range of the triangulation lasers, the positioning tables 30 would be unnecessary.

Figure 3:
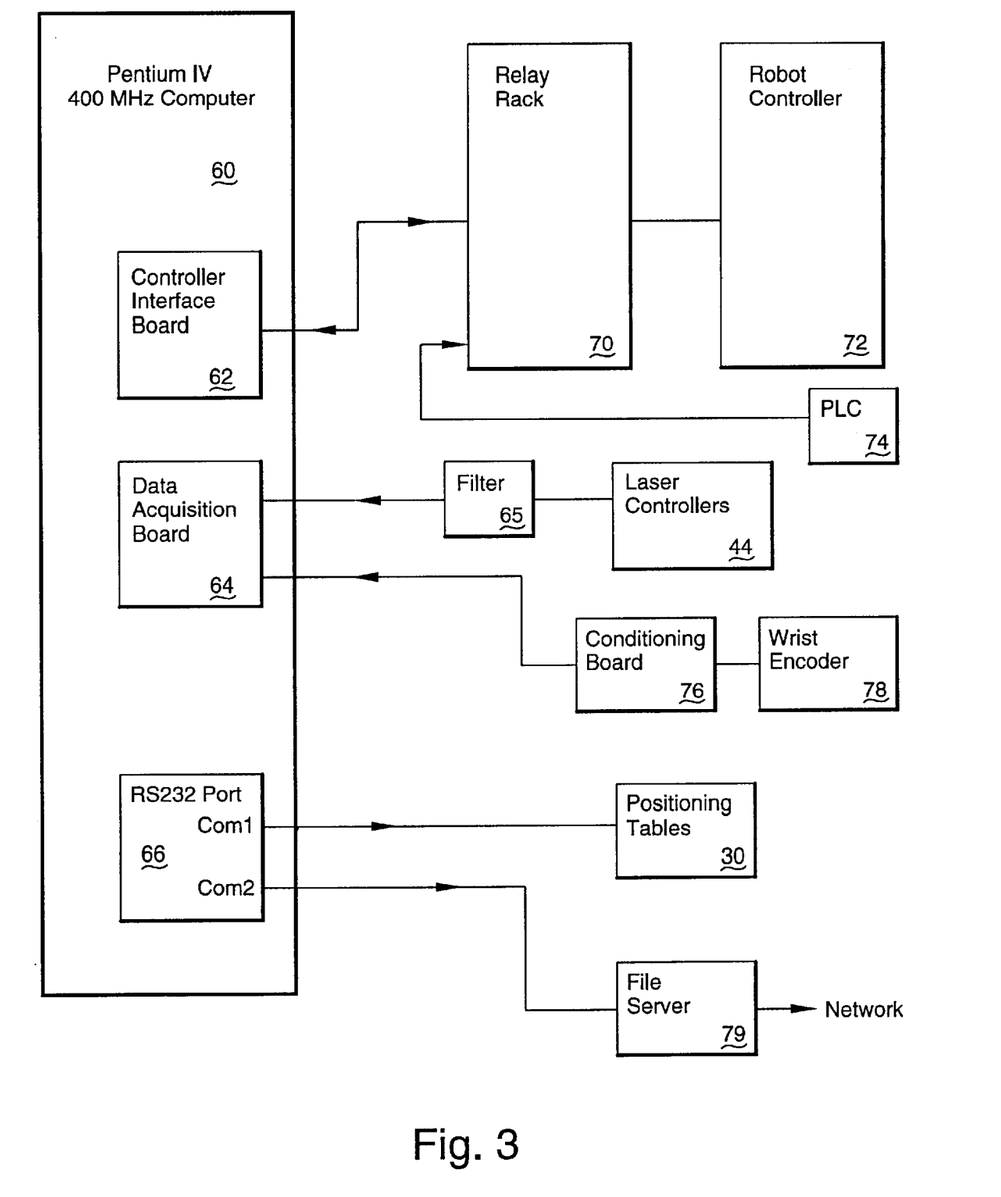
FIG. 3 is a diagram schematic of the electronics of the machine of FIG. 1.

FIG. 3 is a block diagram showing the programmable computer and associated electronics of a preferred embodiment of the present invention, and their relationship to apparatus described above. The programmable computer 60 may be any type of computer, such as a commonly available Intel Pentium-based system as shown. The computer includes a controller interface board 62, such as that manufactured by OPTO 22; a data acquisition board (DAQ) 64, such as a Keithly DAS1702HR DAQ; and an RS232 serial communications port 66, which is standard on most microprocessor-based computers.

The controller interface board 62 interfaces with a solid state relay rack 70, which in turn interfaces with a robot controller 72. The relay rack 70, such as a modular I/O rack manufactured by OPTO22, serves to step up the voltage level of signals from the relay board (e.g. 5v) to the input voltage requirements of the robot controller 72 (e.g., 24v), and the rack 70 also may serve to isolate the low voltage from the high transient voltages encountered in the manufacturing environment. In an exemplary manufacturing process, equipment for handling the pipe may be driven by a programmable logic controller (PLC) 74. As shown, the relay rack 70 receives from the PLC 74 a plurality of control signals, which indicate when a pipe is in position for measurement and its nominal size and bell type. The robot controller 72 controls the movements of robot arm 12 and wrist 14 in response to stored programs specific to a particular size pipe or bell type (e.g., an 18-inch diameter pipe with bell type "A" may need to be measured at one set of locations, and a 36-inch pipe with bell type "B" may need to be measured at another set of locations).

The data acquisition board 64 receives a laser displacement signal (representative of the measured distance from the laser to the pipe surface) from the laser controllers 44 and an angular position signal (representative of the angular position of the wrist, and therefore of the laser) from the wrist encoder 78, via a conditioning board 76. These two signals allow the angular position of the robot wrist and the displacement signal of the lasers to be synchronized, such that the distance from the laser to the pipe surface corresponds with a known angular position of the wrist. Noise may be removed from the laser displacement signal by passing it through a 1 Hz low-pass filter 65. Optimally, the robot wrist rotates at a constant velocity, and the encoder indicates its position during this movement. The encoder may output the position of the robot wrist in highly precise increments; for example, the particular encoder used in one embodiment outputs 1000 pulses per revolution, indicating the angular position of the wrist in 0.036 degree increments. Depending on the number of measurement data points desired, and also as constrained by hardware limitations, it may be preferred not to take distance readings at each incremental position transmitted by the encoder 78. In this particular embodiment, it was determined that a distance reading of the pipe surface was needed every two degrees as referenced from the point of rotation of the measurement assembly. Hence, the encoder output is processed by the conditioning board 76, which transmits to the data acquisition board an angular position signal with a pulse indicating each two-degree increment of the angular position of the robot wrist. The output of the conditioning board 76, or indeed its necessity at all, will depend on the particular application and the particular type of wrist encoder used. In this embodiment, the data acquisition board takes a reading of the laser displacement signal at each pulse of the angular position signal. This operation is discussed in more detail below.

The RS232 serial communications port 66 includes a first communications port COM1, which interfaces with the precision positioning tables 30. The positioning tables 30 have a RS232 interface that is responsive to a set of RS232 commands, which may be used to place the laser assemblies 40 in a desired radial position. Optionally, a second communications port COM2 transmits data to a file server 79, which in turn is connected to a broader computer network. Alternative methods of networking the computer 60 are well known in the art. Indeed, those skilled in the art will recognize many ways to implement the interface and communications between the computer 60 and the robot 10 and the measurement assembly 20. For example, in this embodiment the robot wrist rotates the measurement assembly at a constant velocity for 180 degrees, and measurement readings are taken from each laser at every two degrees. An alternative, but slower method of control, would be to cause the wrist to rotate two degrees, stop, and take a reading, and repeat this process 180 times.

Figure 4:
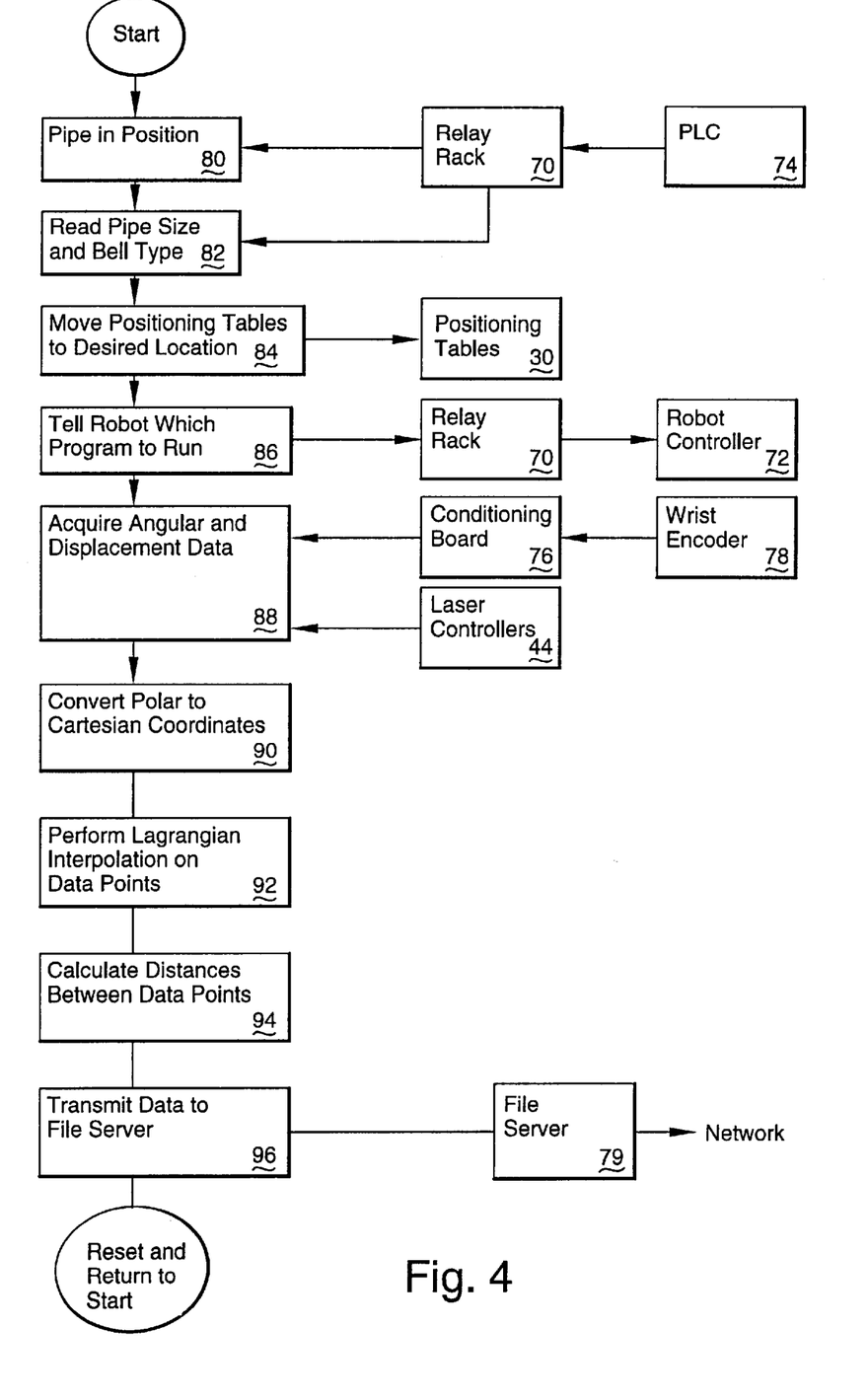
FIG. 4 is a flow chart of a version of the computer program of the present invention.

FIG. 4 is a flow chart of the computer program which controls the operation of the above-described components and processes measurement data to determine the shape of the pipe. In block 80, the program waits for a signal from the relay rack 70, which is in communication with the PLC 74 indicating a pipe is in position and ready to be measured. Next, in block 82 the program reads the pipe size and bell type from the interface rack. Based on the pipe size and bell type, in block 84 the positioning tables 30 are moved into the desired location to bring the lasers within their optimal range with respect to the surface of the pipe to be measured. The program then outputs a command to the relay rack, which in turns relays it to the robot controller, telling the robot which measurement program to run. As noted above, the robot stores programs specific to particular pipe sizes and bell types. The robot then begins running the selected program. It positions the measurement assembly 20 at the longitudinal location at which the cross-sectional shape of the pipe is desired.

There may be one or more of such locations for a given pipe size or bell type. (Alternatively, in a particular application only a sample cross-section of the pipe may be needed, without regard to a particular longitudinal location. In such an application, therefore, precise longitudinal positioning would be unnecessary.) After the measurement assembly is positioned, it is rotated at a constant velocity by the robot wrist. As it rotates, the rotary encoder transmits the position of the wrist to the conditioning board, which in turn transmits the angular position signal to the data acquisition card. It should be noted that the lasers emit their beams all times in order to maintain temperature stability and therefore consistency of measurement.

Figure 5:
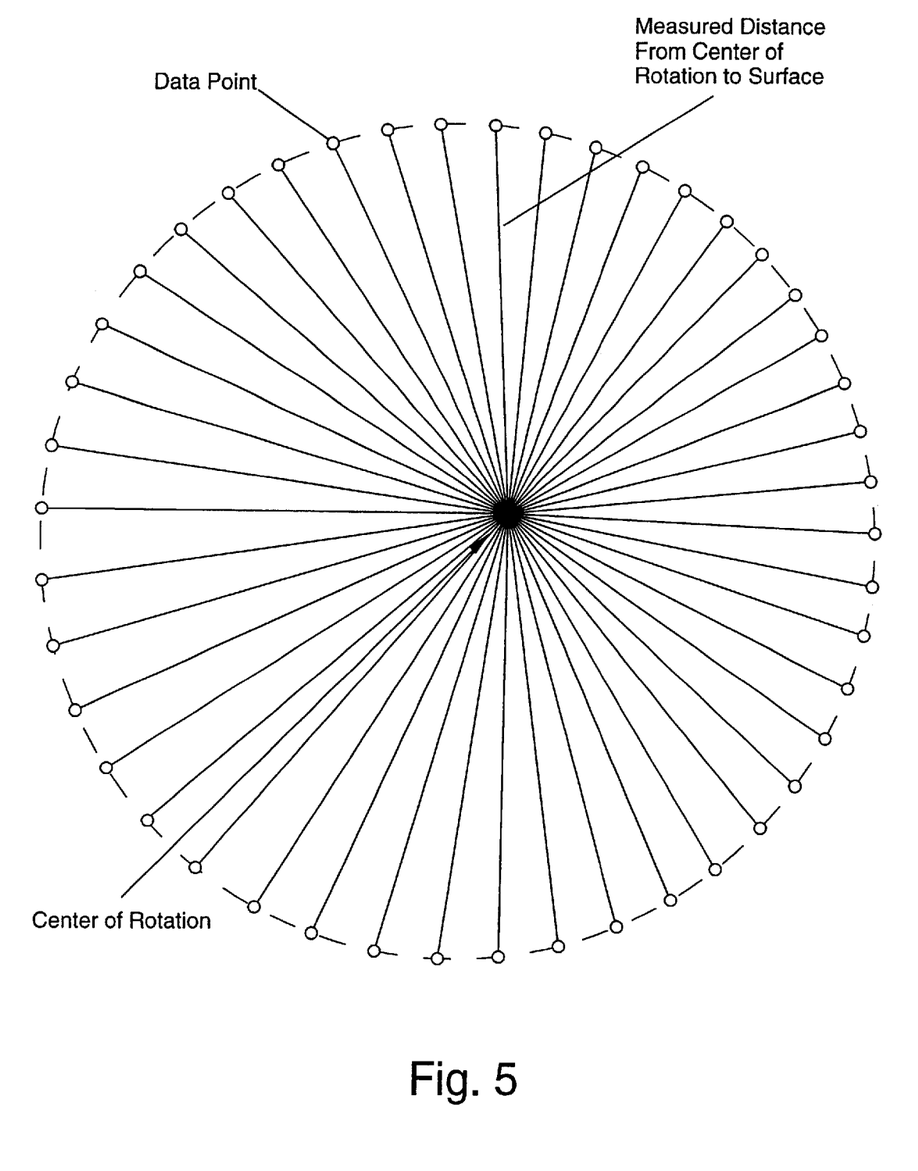
FIG. 5 is an exemplary graphical illustration of the data points acquired by the machine of FIG. 1.

In block 88, the angular position signal is monitored and distance data from the laser controllers 44 is acquired in response to the angular position signal. This data is read and stored by the program. FIG. 5 illustrates an exemplary pattern of data points acquired by this method. In a preferred embodiment, the angular position signal comprises a pulse train, each pulse representing a two-degree increment, from which the angular position of each reading is determined. The program adds the value of this reading to the displacement from the center of rotation of the laser on the positioning table to calculate the total distance (R) from the center of rotation to the measured point on the pipe. The program stores as polar coordinates (R,Θ) this total distance and the angular position at which it was measured. Next, in block 90, the program converts the polar coordinates (R,Θ) to cartesian coordinates (X,Y), with the point (0,0) being the center of rotation. At this point, the program has stored a set of Cartesian coordinates (or data points) that represent points on the surface of the pipe. Note that the center of rotation need not be the center of the pipe. A basic statistical analysis may be performed on the data set to ensure it falls within an acceptable range or to detect grossly out-of-range readings caused by some equipment error.

With surface of the pipe now mapped by a set of Cartesian coordinates, the distance between any two points can be calculated by the distance equation:

$$d=\sqrt{(x_1-x_2)^2+(y_1-y_2)^2}$$

where d is the distance between the points $(x_1,y_1)$ and $(x_2,y_2)$. The distance between points on opposite sides of the circle shown in FIG. 5 would approximate the diameter. However, because the center of rotation of the measurement assembly was offset from the actual center of the circle, it is unlikely that the calculated distances will pass through the center of the circle. Thus, the distances are not true diameters.

Figure 6:
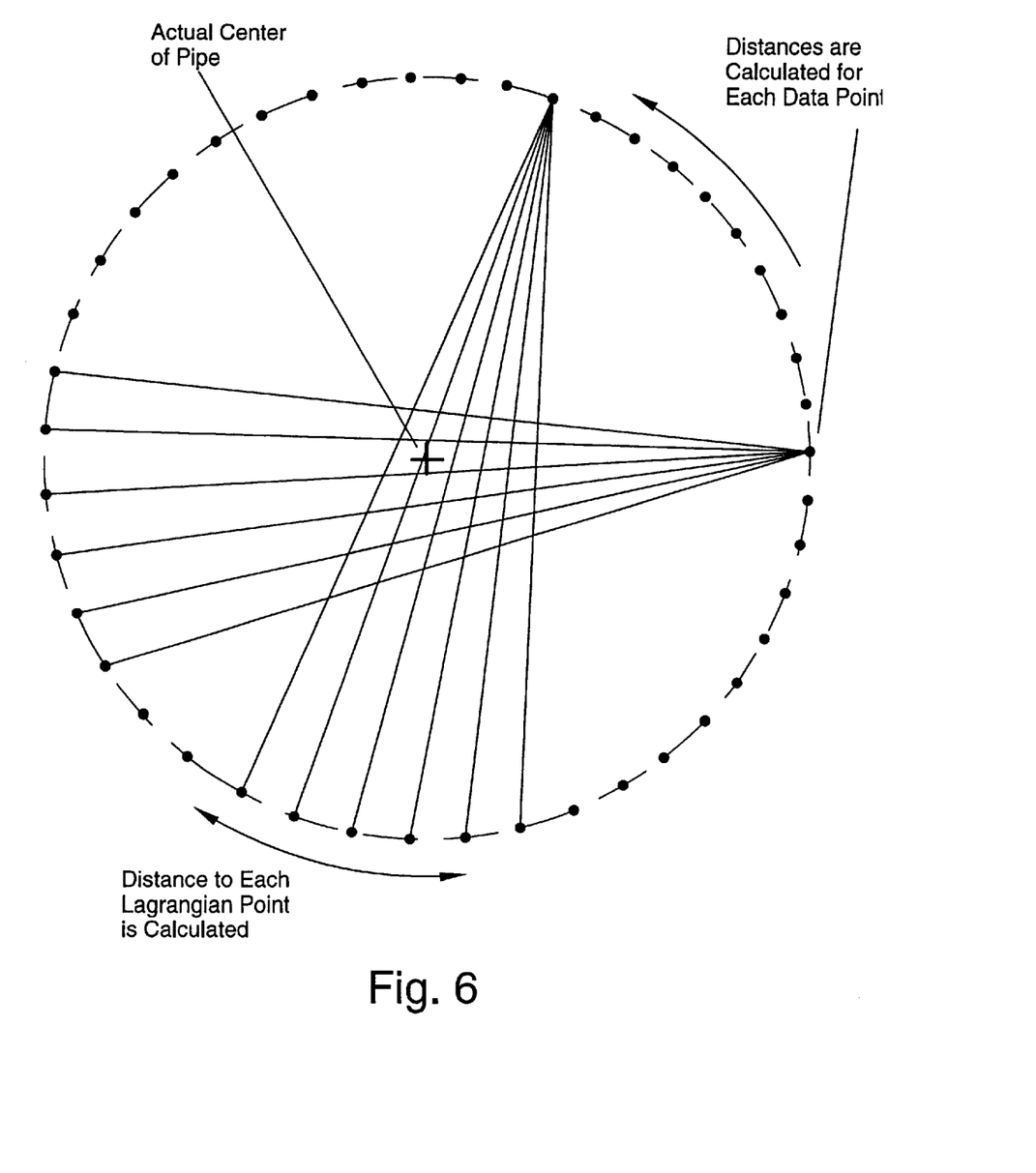
FIG. 6 is an exemplary graphical illustration of the calculations and analysis performed on the data by a preferred version of the present invention.

In order to find the true diameter (and true shape) of the pipe, the program in block 92 performs LaGrangian interpolation on the acquired set of data points to create additional cartesian points representing the measured cylinder. As many points as necessary, usually fifteen to twenty-five, can be added between each pair of laser-acquired points. In block 94, the program then calculates the distance from each point to a set of points on the opposite side of the pipe, or to every other data point if so desired. Thus, rather than calculating the distance from a first point to about five points on the opposite side of the pipe in order to determine the diameter, the program has access to 100 or more points opposed to the first. These additional points make finding the true diameter, and true shape of the pipe, very accurate. Of the 100 or so distances that are calculated for each data point the true diameter will be the maximum distance. That distance will pass through the center of the pipe. FIG. 6 illustrates this principle. Again, a simple statistical analysis may be performed on the calculated distance to ensure it is not the result of a gross error or malfunction. In block 96 the data is transmitted to a file server on a computer network, and finally the program resets itself and returns the beginning.

As a result of the above calculations, the shape of the pipe and the true profile of its surface have been determined. The program may compare the actual shape of the pipe to a desired shape, or actual dimensions to target dimensions, and accept or reject the pipe according to specific tolerances. In one embodiment, in which the shape of the pipe is determined in three locations, the entire measurement process, from the time the pipe is in position to the decision to accept or reject the pipe, takes approximately 10 seconds. Because the data for each pipe measured is stored, statistical analysis on the manufacturing process as a whole may be performed. In addition, the program could drive additional apparatus that would mark areas on the pipe to be ground into conformance with the desired shape.

Figure 7:
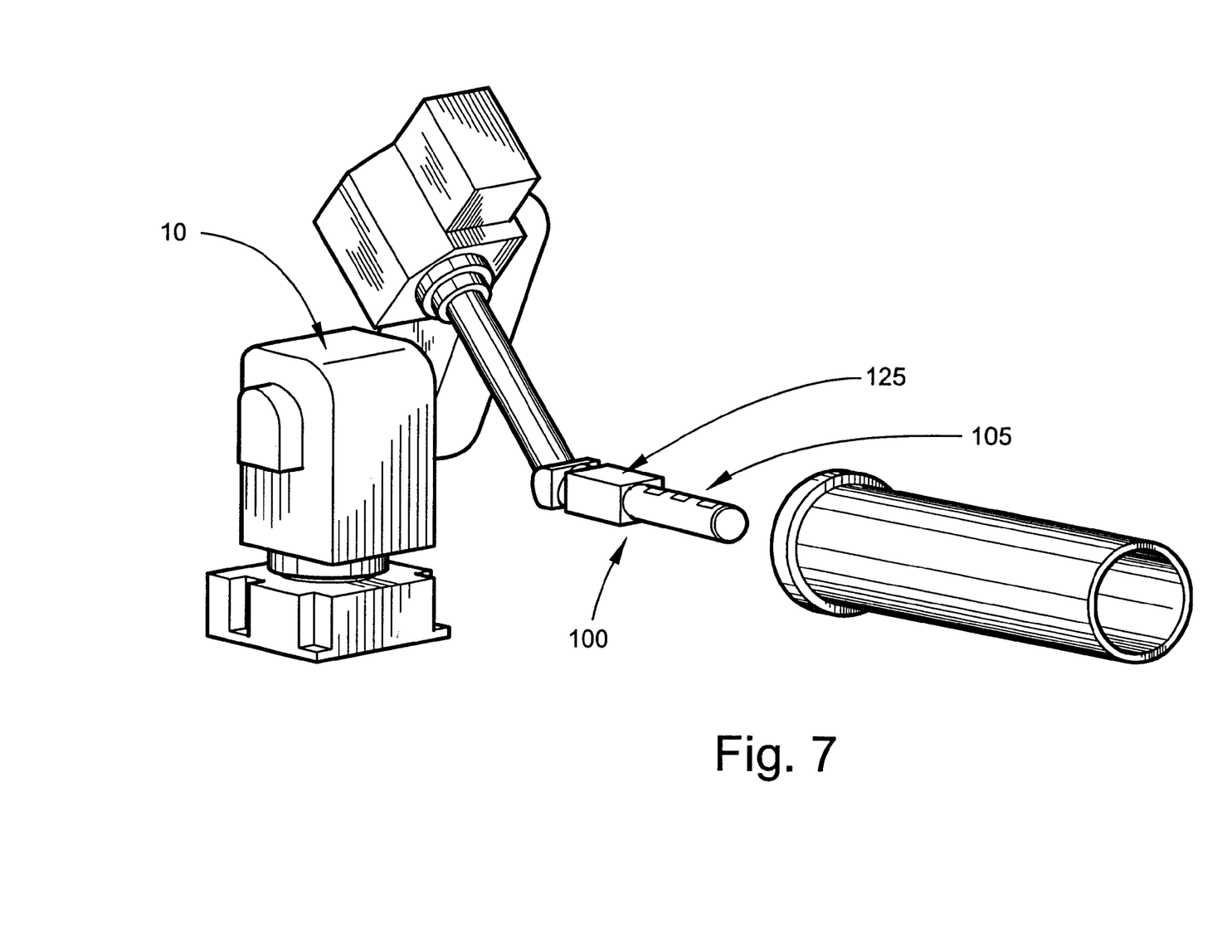
FIG. 7 is a perspective view of a second embodiment of the present invention.
Figure 8:
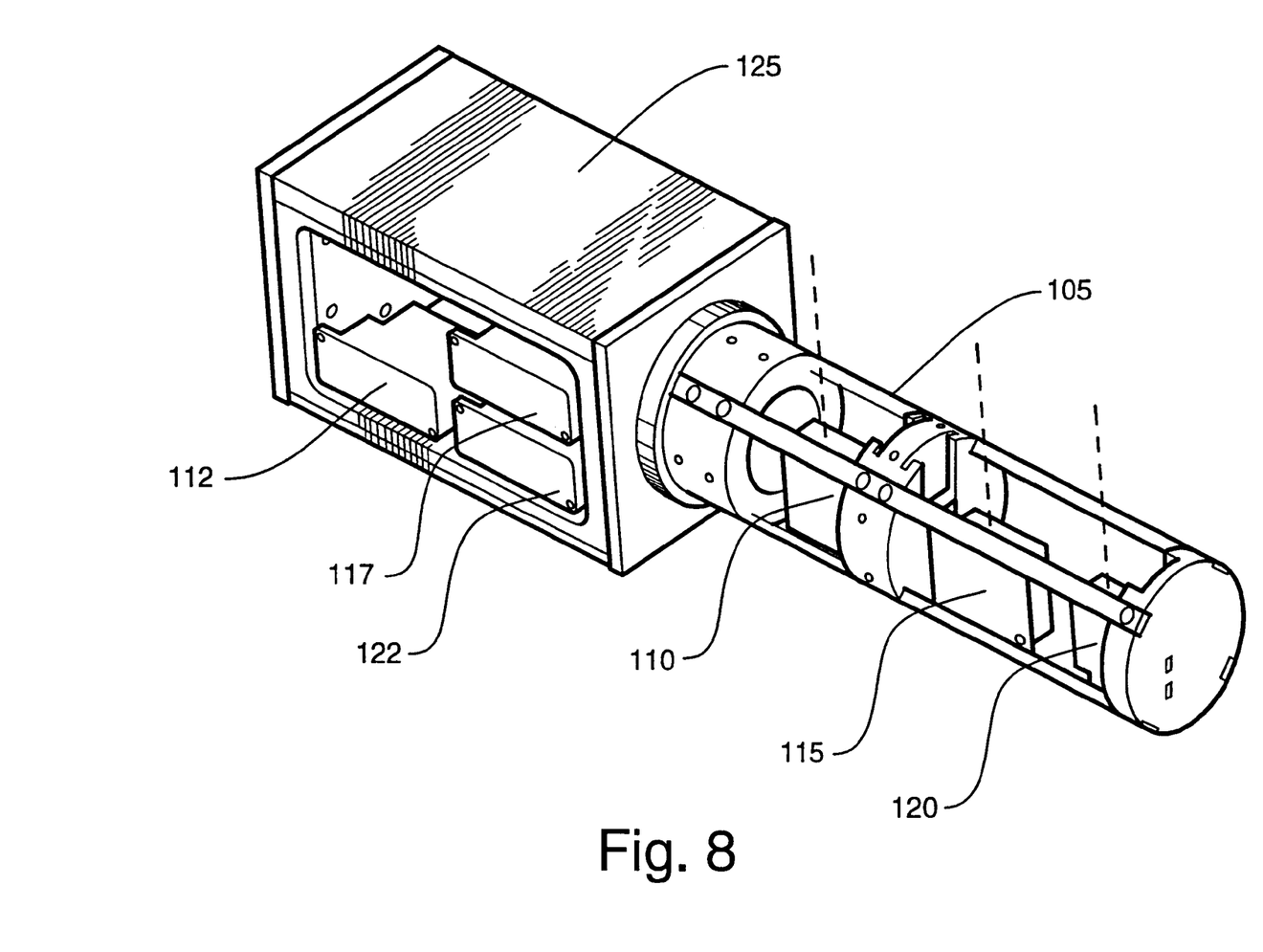
FIG. 8 is a partially broken away perspective view of the measuring apparatus of the machine of FIG. 7.

FIG. 7 shows a second embodiment of the present invention. A measurement assembly 100 is mounted to the robot 10, and a programmed computer and associated electronics (not shown) are also included, as described above. However, in this embodiment, the radius of the pipe under test is within the optimal range of the non-contact measuring device in the measurement assembly 100. Hence, positioning tables are not necessary. Otherwise, the apparatus operates in a very similar manner to that described above. FIG. 8 is a partial breakaway of the measurement assembly 100 of this embodiment. The assembly includes a laser enclosure 105 and a controller enclosure 125. The lasers 110, 115, and 120 are mounted in a fixed, known position in the laser enclosure 105 and are connected to the laser controllers 112, 117, and 122, respectively. The laser controllers are housed in the controller enclosure 125. Three triangulation lasers, each optimized to a particular range, are required to measure nominal pipe sizes from four to twelve inches. Under the present state of the art, a single laser will not satisfactorily measure all sizes, and indeed, the pipe sizes are too small for positioning tables.

Figure 9:
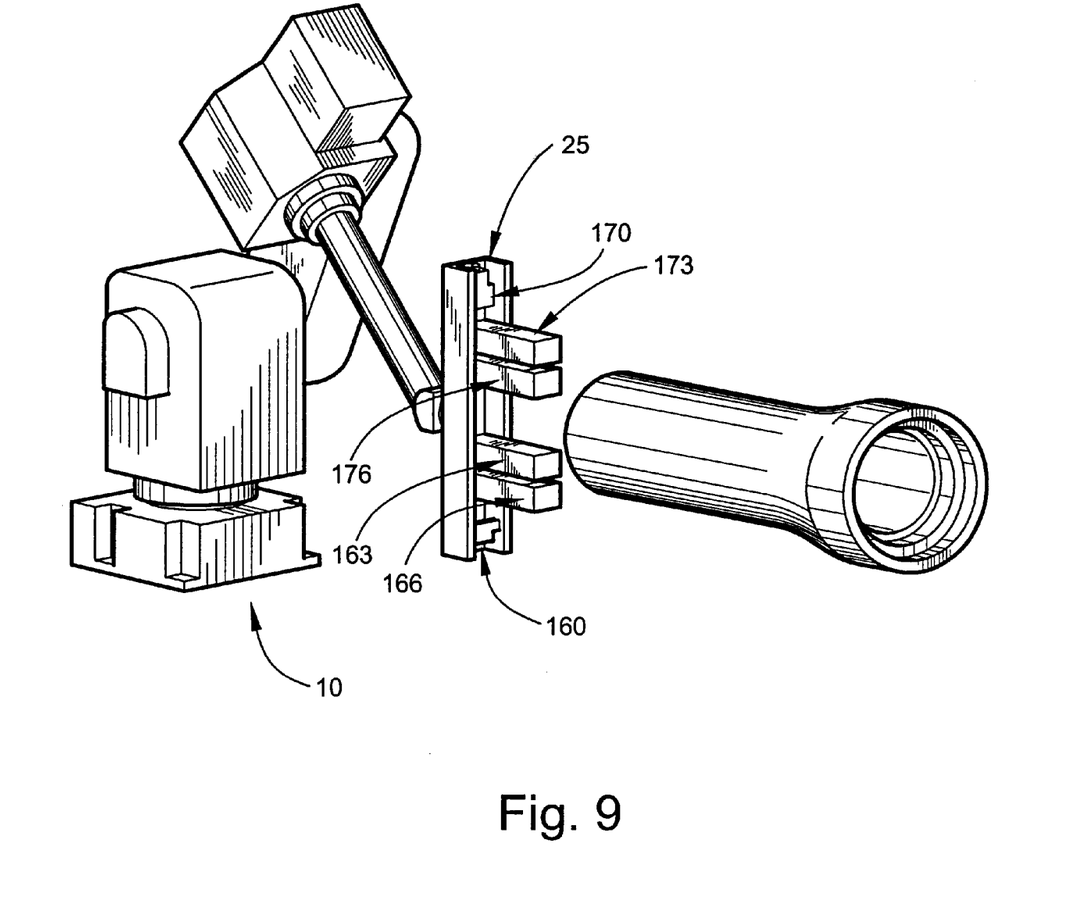
FIG. 9 is a perspective view of a third embodiment of the present invention.

FIG. 9 shows a third embodiment of the present invention. In this embodiment, the measurement assembly 150 is configured to measure the thickness of the wall of a pipe. The measurement assembly 150 comprises an adaptor bracket 25, to which a first positioning table 160 and a second positioning table 170 are mounted. As shown, an opposing pair of laser assemblies is mounted to each positioning table, one laser assembly to measure the inner surface of the pipe, the other measure the outer surface of the pipe. The laser assemblies are oriented such that the laser beams of each pair face one another. Each laser assembly is mounted to its respective positioning table at a fixed distance from its opposed assembly. This distance must be wider than the wall of the thickest pipe that is to be measured, but narrow enough to keep each laser within its optimal range during measurement. The first positioning table 160 radially positions the first pair of lasers 163 and 166, and the second positioning table radially positions the second pair of lasers 173 and 176, so that the wall of the pipe under test is aligned with the space between each pair of lasers.

In use, the programmed computer 60 (not shown) receives a signal indicating a pipe is in position and reads the pipe type and bell size from the relay rack 70 as described above. Based on this information, the program causes the positioning tables to place each pair of laser assemblies in the proper radial position to measure wall thickness. The program then issues a command to the robot controller 72 via the relay rack 70 telling the robot 10 the proper program for the pipe under test. The robot then places the measurement assembly 150 in the desired longitudinal position, such that the pipe wall is between each pair of lasers. As described in detail above, the measurement assembly is rotated at a constant velocity by the robot wrist 14, and the program receives a distance reading from each of the four lasers in response to the angular position signal from the wrist encoder 78 via the conditioning board 76. The program stores each distance reading paired with the angular position at which it was taken.

At this point multiple approaches for processing the data can be taken. Given that the fixed distance between the two lasers in each pair is known, it is simple arithmetic to subtract the sum of the distance readings of each laser in the pair at a given angular position from this fixed distance to determine the thickness of the wall of the pipe at the angular position. By repeating this process for all the data points, the wall thickness around the pipe can be determined. Variations in the thickness and the average thickness, and other statistical analyses, can be performed. However, because the center of rotation of the measurement assembly does not necessarily coincide with the center of the pipe, this method does not reveal the cross-sectional shape of the pipe.

Alternatively, a method similar to that described with respect to first embodiment above can be employed. The distance from the center of rotation to each laser is a known quantity. The distance reading of each laser can be added to or subtracted from this known distance, depending on whether the particular laser is on the inside or outside of the pipe wall. The result of this operation gives a radial distance (R) for each point, both on the inside and outside of the pipe, at each angular position ($\Theta$). Assuming (as in a preferred embodiment) the distance readings for each pair of lasers are captured simultaneously, the difference between the radial distances at a particular angular position is the thickness of the pipe at that point.

If greater precision is required, the radial distance and angular position may be paired into polar coordinates, which are then converted to Cartesian coordinates. Two sets of data points, one for the inner surface and one for the outer surface, are maintained. LaGrangian interpolation may be used to supply additional points. Hence, both the inner and outer surface of the pipe are mapped onto a Cartesian plane. The distances between a point in the inner set and the points of the outer set are calculated. The shortest distance lying between two points indicates that those two points are radially aligned, which therefore represents the wall thickness between those points. Also, the inner and outer diameters, and shape of the pipe, may be determined as described with respect to the first embodiment.

Although the present invention has been described in considerable detail with reference to certain preferred embodiments thereof, other embodiments are possible. The foregoing description is therefore considered in all respects to be illustrative and not restrictive. For example, one could substitute a human-operated mechanical arm and rotary joint for the robot described, or use computer hardware to acquire and analyze the data Pipe, and the process of manufacturing it, has been used throughout as the exemplary work piece and environment for the present invention. However, it should be understood that the apparatus and methods disclosed herein apply equally to other cylindrical objects and their manufacture. Upon reading the foregoing disclosure, this and other variations would be apparent to those skilled in the art. Therefore, the present invention should be defined with reference to the appended claims and their equivalents, and the spirit and scope of the claims should not be limited to the description of the preferred embodiments contained herein.

What is claimed is:

1. A non-contact measuring device for measuring a cylindrical object, said device comprising:
   a measurement assembly, the assembly comprising non-contact measuring means for providing a linear displacement signal;
   rotating means for controllably rotating the assembly, the assembly mounted to the rotating means, the rotating means comprising means for providing an angular position signal;
   data acquisition means for receiving the linear displacement signal and the angular position signal and acquiring therefrom data points comprising a linear displacement and a corresponding angular position;
   computing means, in communication with the data acquisition means, for determining the dimensions of the object from the data points.

2. The device of claim 1, wherein the measurement assembly further comprises:
   a positioning table oriented radially with respect to the rotating means,
   the measuring means mounted to the positioning table such that the positioning table may radially position the measuring means.

3. The device of claim 2, wherein the positioning table is responsive to commands from the computing means to place the measuring means in a predetermined radial position.

4. The device of claim 3, further comprising:
   means for controllably positioning the rotating means longitudinally within the object, the rotating means mounted to the longitudinal positioning means.

5. The device of claim 4, wherein the rotating means and the longitudinal positioning means are responsive to commands from the computing means to place the measuring means in a predetermined longitudinal position and rotate it in a predetermined manner.

6. The device of claim 5, wherein the measuring means uses a triangulation laser to measure the distance to the surface of the object.

7. A non-contact measuring device for measuring a cylindrical object, said device comprising:
   a measurement assembly comprising a laser for providing a linear displacement signal;
   a rotatory joint, the assembly mounted to the joint, the joint comprising encoder means for providing an angular position signal;
   a controller for controllably rotating the joint;
   a programmable computer comprising:
      data acquisition means for receiving the linear displacement signal and the angular position signal and acquiring therefrom data points comprising a linear displacement and a corresponding angular position;
      a computer program comprising the following steps: reading the acquired data points from the data acquisition means; determining the dimensions of the object from the data points.

8. The device of claim 7, further comprising:
   an arm with a terminal end, the joint coupled to the terminal end, such that the arm may place the measurement assembly in a desired longitudinal position within the object;
   and wherein the controller controllably extends the arm.

9. The device of claim 8, wherein the measurement assembly further comprises:
   a positioning table oriented normally with respect to the axis or rotation of the rotary joint; the laser mounted to the positioning table such that the positioning table may radially position the lasers.

10. The device of claim 9, wherein the controller and the positioning table are responsive to the computer to position and rotate the laser in a predetermined manner.

11. The device of claim 7, wherein the determining step of the computer program comprises:
    storing the acquired data points as a polar coordinates representative of locations on the object's surface;
    converting the polar coordinates to a cartesian coordinates;
    calculating the distance from each data point to a every other of data point,
    finding the longest calculated distance, the longest distance approximating the diameter of the object.

12. The device of claim 11, where in the determining step of the computer program further comprises:
    between the converting and calculating step, interpolating a plurality of data points between the acquired data points,
    and wherein the longest calculated distance is the true diameter of the object.

13. The device of claim 7, wherein the determining step of the computer program comprises:
    storing the acquired data points as a polar coordinates representative of locations on the object's surface;
    converting the polar coordinates to a cartesian coordinates;
    interpolating a plurality of data points between the acquired data points,
    mapping the data points on a cartesian plane, the map being the cross-sectional shape of the object.

14. A method of determining the diameter of a cylindrical object without locating the center of the cylinder, said method comprising:
    positioning a non-contact measurement means within the object;
    rotating the measurement means;
    acquiring polar coordinates of data points on the object;
    converting the polar coordinates to cartesian coordinates;
    determining the distances between the data points, the longest distance being the diameter of the cylinder.

15. The method of claim 14, further comprising:
    after the converting step, interpolating additional data points.

16. A device for measuring the thickness of the wall of a cylindrical object, said device comprising:
    a measurement assembly comprising an inner laser and an outer laser oriented in opposition to one another and spaced apart to allow the wall of the object to be placed therebetween, such that the lasers will strike points on the opposite sides of the wall from one another, the inner laser providing an inner linear displacement signal and the outer laser providing an outer linear displacement signal;
    a rotatory joint, the assembly mounted to the joint, the joint comprising encoder means for providing an angular position signal;
    a controller for controllably rotating the joint;

a programmable computer comprising:
- data acquisition means for receiving the inner linear displacement signal, the outer linear displacement signal, and the angular position signal and acquiring therefrom data points comprising an inner linear displacement, an outer linear displacement, and a corresponding angular position;

a computer program comprising the following steps:
- reading the acquired data points from the data acquisition means;
- determining the thickness of the wall of the object from the data points.

* * * * *